US012668018B2

(12) United States Patent
Stammel et al.

(10) Patent No.: US 12,668,018 B2
(45) Date of Patent: Jun. 30, 2026

(54) METHOD FOR PRODUCING A TUB-SHAPED SANITARY OBJECT MADE OF PLASTIC WITH A VISIBLE SIDE AND A BOTTOM

(71) Applicant: Duravit Aktiengesellschaft, Hornberg (DE)

(72) Inventors: Thomas Stammel, Hornberg (DE); Mohamed Abdelmenem, Cairo (EG)

(73) Assignee: DURAVIT AKTIENGESELLSCHAFT, Hornberg (DE)

( * ) Notice: Subject to any disclaimer, the term of this patent is extended or adjusted under 35 U.S.C. 154(b) by 99 days.

(21) Appl. No.: 18/615,284

(22) Filed: Mar. 25, 2024

(65) Prior Publication Data

US 2024/0316854 A1     Sep. 26, 2024

(30) Foreign Application Priority Data

Mar. 24, 2023     (DE) ..................... 10 2023 107 459.8

(51) Int. Cl.
B29C 51/08          (2006.01)
B29C 33/30          (2006.01)
(Continued)

(52) U.S. Cl.
CPC .......... B29C 51/082 (2013.01); B29C 33/308 (2013.01); B29C 51/008 (2013.01);
(Continued)

(58) Field of Classification Search
CPC .. B29C 51/08; B29C 51/18; B29L 2031/7692
See application file for complete search history.

(56)                References Cited

U.S. PATENT DOCUMENTS 2,531,540 A * 11/1950 Smith .................... B29C 51/428
                                                            264/522
2,796,634 A * 6/1957 Chellis .................... B29C 70/28
                                                            264/296
(Continued)

FOREIGN PATENT DOCUMENTS

CN          107521081 A * 12/2017 ............. B29C 51/44
CN          111805878 B * 9/2022
(Continued)

OTHER PUBLICATIONS

FIT translation of DE 10 2006 030 481 B4, Mar. 25, 2010 (Year: 2010).*
(Continued)

*Primary Examiner* — Benjamin A Schiffman
(74) *Attorney, Agent, or Firm* — LUCAS & MERCANTI, LLP; Klaus P. Stoffel

(57)                ABSTRACT

A method for producing a tub-shaped sanitary object made of plastic with a visible side and a bottom, including the following steps: providing a plastic sheet to be molded to
(Continued)

form the sanitary object; providing a forming device having a frame arrangement including a first frame with a first frame-shaped bending structure and a second frame with a second frame-shaped bending structure, wherein the plastic sheet is to be formed by bending structures; arranging and attaching the heated plastic sheet to the first frame; inserting the second frame into the open first frame into a forming end position so that the second frame takes along the plastic sheet with its bending structure when it is inserted, wherein the plastic sheet is formed into a tub shape by both the first and the second bending structure; and, cooling the formed plastic sheet.

18 Claims, 7 Drawing Sheets

(51) Int. Cl.

| | | |
|---|---|---|
| *B29C 51/00* | (2006.01) | |
| *B29C 51/12* | (2006.01) | |
| *B29C 51/26* | (2006.01) | |
| *B29C 51/30* | (2006.01) | |
| *B29C 51/42* | (2006.01) | |
| *B29L 31/00* | (2006.01) | |

(52) U.S. Cl.

CPC ............ *B29C 51/12* (2013.01); *B29C 51/262* (2013.01); *B29C 51/306* (2013.01); *B29C 51/42* (2013.01); *B29C 2793/0018* (2013.01); *B29L 2031/7692* (2013.01)

(56) References Cited

U.S. PATENT DOCUMENTS

| | | | | | |
|---|---|---|---|---|---|
| 3,218,379 | A | * | 11/1965 | Edwards | ................. B29C 51/04 |
| | | | | | 264/549 |
| 3,291,874 | A | * | 12/1966 | Negoro | ................... B29C 51/04 |
| | | | | | 425/398 |
| 4,750,967 | A | * | 6/1988 | Kott | ...................... B29C 51/262 |
| | | | | | 156/499 |
| 5,427,732 | A | * | 6/1995 | Shuert | .................. B29C 51/006 |
| | | | | | 425/388 |

FOREIGN PATENT DOCUMENTS

| | | | | | | |
|---|---|---|---|---|---|---|
| CN | 113229580 | B | * | 2/2023 | ............. | A44C 27/00 |
| DE | 19506291 | A1 | | 8/1996 | | |
| DE | 19850042 | A1 | | 5/2000 | | |
| DE | 102006030481 | B4 | * | 3/2010 | ............. | B21D 22/24 |
| DE | 202011001658 | U1 | | 6/2011 | | |
| DE | 102022114727 | A1 | * | 1/2024 | ............. | B21D 22/22 |
| EP | 1004425 | A1 | * | 5/2000 | ........... | B29C 51/425 |
| EP | 2295162 | B1 | * | 11/2013 | ............. | B21D 37/02 |
| GB | 1042775 | A | | 9/1966 | | |
| JP | 2008254001 | A | * | 10/2008 | | |

OTHER PUBLICATIONS

German Office Action Dated Nov. 17, 2023, DE102023107459.8, 5 Pages.

Canadian Patent Office issued an Office Action dated Oct. 22, 2025 regarding parallel Canadian Patent Application No. 3232980, 4 Pages.

* cited by examiner

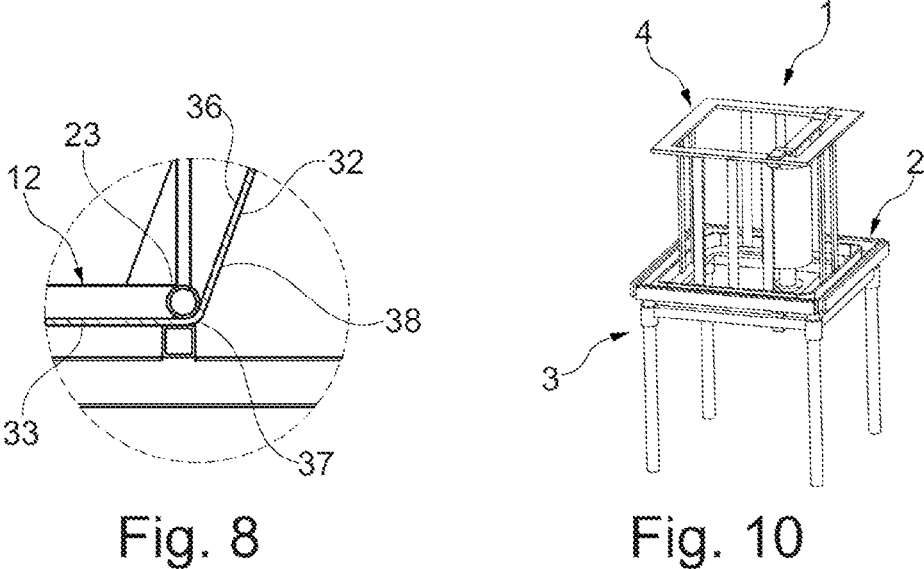
Fig. 8
Fig. 10
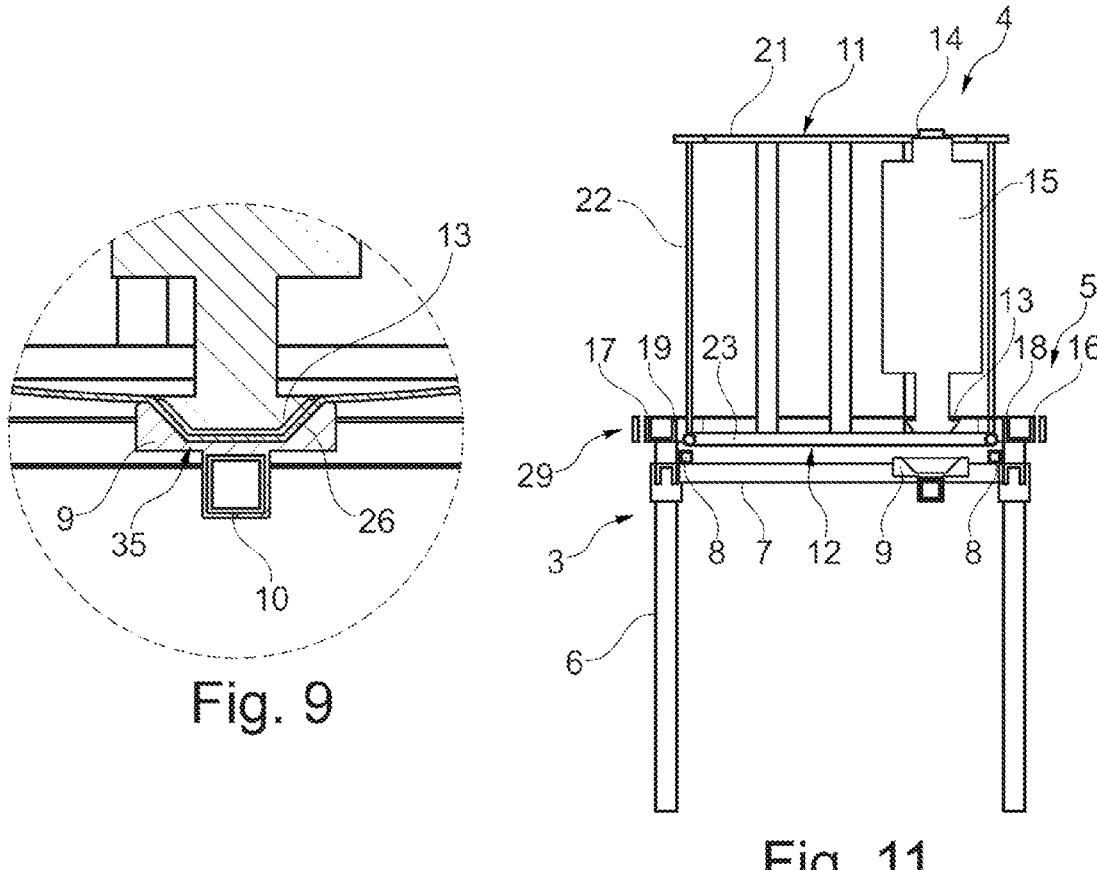
Fig. 9
Fig. 11

METHOD FOR PRODUCING A TUB-SHAPED SANITARY OBJECT MADE OF PLASTIC WITH A VISIBLE SIDE AND A BOTTOM

CROSS-REFERENCE TO RELATED APPLICATIONS

The present application claims priority of DE 10 2023 107 459.8, filed Mar. 24, 2023, the priority of this application is hereby claimed, and this application is incorporated herein by reference.

BACKGROUND OF THE INVENTION

The invention relates to a method for producing a tub-shaped sanitary object made of plastic with a visible side and a bottom.

Such tub-shaped sanitary objects are usually a bathtub or shower tray and are made from a plastic sheet, usually an acrylic sheet, in a deep-drawing process, often also called thermoforming. In this method, the plastic sheet is preheated to 180°-200° C. so that it softens and assumes a formable state. The plastic sheet is placed in a mold, clamped at the sides and sucked against the mold by applying negative pressure from the mold side. The mold forms the entire flat bottom of the tub-shaped formed part, in other words with all edges, recesses and surfaces. A large number of suction channels are distributed across the forming surface so that the plastic sheet is sucked in at several points. After the suction and therefore the forming of the forming surface over the plastic sheet, the formed plastic sheet is cooled and then removed from the mold. The bottom of the formed object is then provided with a reinforcing layer, usually a GRP layer, in order to increase stability. If necessary, reinforcing elements such as reinforcing sheets made of flax, wood or fibers are provided in addition to the GRP reinforcement and embedded in the reinforcing layer, for example.

During deep drawing, the plastic sheet is stretched inhomogeneously, which leads to an inhomogeneous thickness of the formed object. For this reason, an appropriately thick plastic sheet should always be used, wherein the thickness ultimately depends on the degree of forming. The thickness must be selected so that the resulting thickness after deep drawing is still sufficient in the areas where the material is stretched the most. Since the material is sucked against the forming surface and rests against it, it inevitably cannot flow freely, since the contact and suction create a corresponding friction or adhesion, which is one of the causes of inhomogeneous forming. If the material is stretched too much, the appearance of the product deteriorates. An orange peel effect typically occurs in areas of extensive elongation. Any imperfection that occurs in the mold will be imprinted into the plastic sheet. Further limitations arise from the fact that the material must adapt to the inner radii, in other words the geometry of the deep-drawing mold given in the area of bends. This means that the inner radii are generally in the region of 40 mm; tighter radii are not possible. In any case, the inside of the molded part, in other words the visible side of the subsequent sanitary object, must be manually reworked, in other words ground and polished, in order to eliminate any defects or inhomogeneity. Another disadvantage of the deep-drawing method is that only one type of object can be produced with one mold, for example a shower tray or bathtub with a defined, unchanging geometry such as a defined depth, for example. If a slightly deeper tub is to be produced, a new mold must be built and used. A separate mold is required for bathtubs that differ only in the position of the drain.

SUMMARY OF THE INVENTION

The invention is therefore based on the problem of providing an improved method for producing such a sanitary object.

To solve this problem, the invention provides a method for producing a tub-shaped sanitary object made of plastic with a visible side and a bottom, comprising the following steps:

proviing a plastic sheet to be molded to form the sanitary object, providing a forming device comprising a frame arrangement having a first frame with a first frame-shaped bending structure and a second frame with a second frame-shaped bending structure, wherein the plastic sheet is to be formed by means of the bending structures, arranging and attaching the heated plastic sheet to the first frame, inserting the second frame into the open first frame into a forming position in such a way that the second frame takes along the plastic sheet with its bending structure when it is inserted, wherein the plastic sheet is formed into a tub shape by means of both the first and the second bending structure, cooling the plastic sheet.

In the method according to the invention, a flat mold is no longer used, as is the case with deep drawing, but rather only two frames that can be inserted one into the other, on each of which frame-shaped bending structures are provided, by means of which the geometric forming takes place. This is based on the fact that a tub-shaped sanitary object is ultimately only characterized by a few bending areas in the area of its upper edge and in the area of the tub bottom, wherein these bending areas are approximately linear or are very narrow linear sections. These edge-side and bottom-side bending areas are connected to each other by means of straight surface sections.

In the method according to the invention, the heated plastic sheet is clamped onto the first frame and fixed to it. The first frame comprises a first bending structure. It is open so that the second frame can be inserted into it from above. The second frame comprises a second bending structure, wherein this second bending structure, when the second frame is inserted into the first frame, runs against the plastic sheet and, because it is softened by the heating, takes it with it and lowers it into the first frame. In this case, the plastic sheet is formed by means of the first bending structure of the first frame, in other words a corresponding circumferential edge bend is produced in the upper edge area, by means of which the edge area is separated from the tub area. The second frame-shaped bending structure defines and forms the transition from the tub walls to the tub bottom, in other words the circumferential bottom-side bend is defined and formed by means of it. During this insertion into the forming end position, the plastic sheet therefore only has contact with the first bending structure and the second bending structure, wherein the respective contact there is only approximately linear, since these bending structures only define the narrow, linear bending sections in which a transition from one adjacent surface to another adjacent surface takes place. There is no other surface contact in this process of forming the tub shape. This means that there is only the least possible contact between the two frames or the bending structures and the plastic surface during this forming process, since the forming device is ultimately only reduced to the characteristic lines, in other words the two bending structures, which are essential for the forming process and forming the bends.

These frame-shaped first and second bending structures can, as is usually the case, have a rectangular or square shape, since bathtubs or shower trays are usually rectangular or square in geometry, both on the edge and on the bottom. However, it is also conceivable that the bending structures are round or oval, have the shape of a polygon or, for example in the case of corner baths, have two straight limbs and one curved limb. This means that different bending structure geometries are conceivable, since such tub shapes can also be reduced to a few characteristic lines, which are represented by the bending structures.

Since, according to the invention, there is only a very small, quasi-linear contact between the bending structures and the plastic sheet, by means of which only the bends are formed, the soft plastic material can consequently be stretched completely homogeneously in all intermediate areas, in other words all surface areas (in other words the side walls and the bottom), since the material can flow freely in these areas and can therefore change its thickness homogeneously. This is because in these areas there is no surface contact between the plastic material and any surface area of the mold, since, as described, the contact surface is reduced exclusively to the bending structures. The final thickness of the formed object is therefore extremely uniform in the respective surface areas, as well as in the bending areas. The surface quality of the inside, in other words the visible side, is also excellent and requires no post-processing, since the surface areas are stretched quasi freely in the space as described and are therefore not subject to any friction or similar that could lead to inhomogeneities.

Since the second frame is inserted into the first frame in the method according to the invention and the depth of the sanitary object is therefore also determined by the insertion depth, the forming device according to the invention can also be used to easily vary the forming object accordingly. This is because, for example, if the basic geometry remains the same (for example rectangular shape), the depth of the shower tray, for example, can easily be changed from 3 cm to 5 cm or 7 cm and the like by inserting the second frame slightly further into the first frame. This means that the method according to the invention is also considerably more flexible with regard to the use of the forming device, so that one and the same forming device can be used to produce a sanitary object with a slightly different geometry, in particular depth.

If a sufficiently thick plastic sheet is used, which is also sufficiently stable after forming, no additional reinforcing layer needs to be applied to the rear side of the formed component. However, if it is necessary for reasons of stability and rigidity, a reinforcing layer can be applied, in particular sprayed on, to the bottom or rear side of the formed object after it has cooled down in accordance with the invention. This can preferably be a fiber-reinforced plastic layer, for example a layer reinforced with glass fibers (GRP layer) or a layer reinforced with carbon fibers (CFRP layer). If required, a reinforcing element can also be embedded in this reinforcing layer at one or more prominent points, for example below the bottom or along an edge. Such a reinforcing element can be plate-shaped, but also strip-shaped or designed as an angled strip-shaped profile. It can be made of wood or a fiber material, but plastic reinforcing elements are also conceivable.

In one development of the method according to the invention, it is provided that a frame arrangement having a first frame is used, the first bending structure of which comprises an outer first structural section and a second structural section which extends parallel thereto and is lying inside the first structural section, wherein the heated plastic sheet is arranged on the first frame in such a way that it is bent with its side edge around the first structural section which is lying further outside, forming an edge section of the sanitary object. The quasi two-part geometry of the first bending structure makes it possible to form a double-bent edge area, as is usual with bathtubs and shower trays. An edge bend is formed over the outer first structural section, which runs regularly vertically downwards and is approx. 1-10 cm high. This is followed by a mostly horizontal edge section, which then merges into the neighboring tub surface by means of a bend which is formed by the inner second structural section. This means that a double-bent edge structure can be formed by these two structural sections.

The plastic sheet can be arranged resting on the two structural sections which extend in a common plane. Both frame-shaped structural sections lie with their contact edges, on which the plastic sheet rests, in a common plane. This means that the plastic sheet rests on both and not just on one and is only guided against the other during forming. This inevitably leads to the formation of a horizontal upper edge, which is bent on the outside and merges into the tub surface on the inside.

Alternatively, it is also conceivable that the plastic sheet is arranged resting only on the first structural section which is lying further outside and is only moved against the second structural section which is lying lower and is formed over this when the second frame is inserted. In this case, the heated plastic sheet only rests on the outer first frame-shaped structural section after it has been arranged on the first frame. Only when the process of inserting the second frame begins, in other words when the second bending structure moves against the plastic sheet and takes it into the first frame, does the plastic sheet come into contact with the inner first structural section and is then bent around it. As a result, the upper edge that forms runs at a slight angle to the inside of the tub, depending on the height difference between the two structural sections. This has the advantage, particularly with shower trays, that water cannot collect on it, but that the water runs off the edge into the tub area.

As described, the second frame with its frame-shaped second bending structure is inserted into the first frame for forming. The insertion depth inevitably defines the depth of the tub area. It is expedient if the second frame is inserted into the first frame until it reaches a stop against which the second frame runs or against which the plastic sheet is moved during forming. This stop therefore limits the insertion depth, so that it is ensured that the second frame is always inserted to the same depth during each production process and consequently that the formed objects are therefore identical.

In this context, it is advantageous if a frame arrangement is used in which the stop is height-adjustable. This makes it easy to create different depths, for example of a shower tray, although the shower tray itself always has the same basic shape. By simply changing the height of the stop, the tub depth can therefore be adjusted so that different tub types for different markets or similar can be produced with the same forming device. In this context, it is even conceivable that, if the frame arrangement is rectangular in shape, the same frame arrangement can actually be used to produce shower trays and bathtubs that have the same basic rectangular shape. This is because it is conceivable in principle to produce a lower shower tray and a deeper bathtub by using different insertion depths. If the first bending structure with its two structural sections is not interchangeably arranged on a framework structure, the different tubs have the same edge geometry. However, if the first bending structure can be exchanged, this simple exchange also makes it possible to produce different tub types with different edge geometries despite using the same frame arrangement.

A tub-shaped sanitary object usually comprises a drain that allows a pipe to be connected. The drain is defined or formed by a corresponding drain geometry which is molded into the plastic material. In order to form such a drain geometry, it may be further provided according to the invention that, when the second frame is inserted or after reaching the forming end position, a male forming element which is provided on the second frame locally forms the plastic sheet, while forming a drain geometry. The second frame is therefore provided with a corresponding forming element that locally forms the plastic sheet so that a specific local drain geometry is formed. This then only needs to be opened by cutting it out.

It is expedient if the male forming element is brought into operative connection with a female forming element which is provided on the first frame in the forming end position. The male forming element thus interacts with a female forming element, wherein the section of plastic sheet is accommodated between the two forming elements and formed in accordance with the geometry of the forming elements. Both forming elements are the only parts that define the corresponding forming surfaces, since the drain geometry usually has a ring-shaped, slightly conical structure.

The height position of the female forming element is fixed during the forming process, but it can be adjusted vertically if necessary to adapt the height. During forming, the male forming element is preferably only moved vertically after the bending structure has reached the forming end position, which can be done, for example, using a hydraulic or pneumatic adjusting cylinder or even an electric motor, so that the male forming element is moved against the female forming element, taking the sheet section with it, while forming the drain geometry.

It is particularly advantageous if a frame arrangement is used in which, if only the male forming element is provided, this male forming element is arranged on the first frame in its position which can be changed, or in which both the male forming element and the female forming element are arranged on the first and second frame in their position which can be changed. Consequently, this embodiment of the invention permits a change in position of the forming element or elements, which is synonymous with the fact that the position of the drain geometry on the sanitary object can be changed. By changing the position accordingly, it is possible to form the drain geometry in the middle or at a longitudinal end of a rectangular bathtub, for example, or in a desired corner of a shower tray and the like. It is only necessary to position one or both forming elements accordingly in their longitudinal and transverse position on the respective frame.

In addition to the method itself, the invention also relates to a forming device for producing a tub-shaped sanitary object made of plastic with a visible side and a bottom, comprising a frame arrangement having a first frame with a first frame-shaped bending structure and a second frame with a second frame-shaped bending structure, wherein the second frame can be inserted into the first frame while taking with it a plastic sheet which is fixed to the first frame and the plastic sheet can be formed by means of the bending structures of both frames while forming bends.

The forming device is therefore a pure frame construction, which only comprises the two frames with their two frame-shaped bending structures. The forming device according to the invention does not have any forming surfaces or the like.

The first frame can have a first framework structure on which the first bending structure is arranged, and the second frame can have a second framework structure on which the second bending structure is arranged. Both frames therefore have corresponding structures that act as carriers for the respective bending structures. The bending structures can be fixed or, preferably, also detachable and thus interchangeable on the framework structures. The interchangeability enables a certain flexibility and adaptability of the bending structure of the frame, so that different edge geometries can be produced by simply interchanging the first bending structure, for example.

The first bending structure can be formed by means of flat struts which have a rectangular cross-section and are connected in a frame-shaped manner and the second bending structure can be formed by means of round or oval struts which are connected in a frame-shaped manner. As described, the first bending structure is used to form the edge of the tub, wherein somewhat sharper bends, in other words bends with a smaller radius, are usually provided in this area. These are expediently formed by means of suitable flat struts, in other words thinner and strip-shaped metal struts, which are rounded accordingly on the edge side so that the corresponding rounding of the bend, in other words the radius, is formed.

In contrast, the second bending structure, which defines the bend on the visible side of the sanitary object in the transition from the tub surfaces to the bottom, is formed from struts that are round or oval in cross-section, since there is usually a slightly larger radius there than in the edge area. These round or oval struts are expediently designed as tubes or rods.

The method according to the invention or the forming device according to the invention basically allows the formation of significantly sharper bends, in other words bends with a significantly smaller radius than is possible with deep drawing. With the second bending structure, inner radii of at least up to 8 mm can easily be formed, wherein the inner radius formed depends on the diameter or geometry of the struts of the second bending structure.

The struts of the respective bending structures each form a closed frame. They are preferably made of metal and are accordingly firmly which are connected to each other, for example by welding, although plug-in connections, screw connections or the like are also conceivable to maintain modularity.

In order to form a double-bent edge on the sanitary object, the first bending structure preferably comprises an outer first frame-shaped structural section and a second frame-shaped structural section which extends parallel to it and is lying inside the first structural section. This means that two flat strut frames are provided one inside the other and the struts of the flat strut frames ultimately extend parallel to each other. The edge of the plastic sheet is bent downwards around the outer structural section, while the central sheet surface is bent inwards around the inner structural section to form the tub area.

The two structural sections can extend in a common plane, which makes it possible to form a flat, horizontal edge on the sanitary object, since the plastic sheet rests on both structural sections during forming. Alternatively, the first structural section which is lying further outside can be higher than the second structural section which is lower. When the second frame is inserted, the plastic sheet is moved against the lower second structural section so that the edge created leans slightly towards the inside of the tub.

Furthermore, a fixing device for attaching the plastic sheet to the first frame is expediently provided. This fixing device is used to fix and clamp the plastic sheet after it has been placed on the first frame or the attaching structure so that it cannot move when the second frame is inserted. The fixing device is preferably designed to clamp an edge section of the plastic sheet which is bent around the first bending structure, in particular the outer lying first structural sections. The plastic sheet is therefore fixed by simply clamping it.

It is expedient here if the fixing device comprises clamping strips which can be applied laterally against the first bending structure or the first structural section and clamp the edge section thereto. The edge section is already bent during this clamping process, so that the angled edge already described above is formed in a simple and expedient manner. The clamping strips expediently extend over the entire length and width of the bending structure so that the edge can also be bent over the entire length and width of the plastic sheet. The clamping strips can either be pressed on manually and tensioned using a suitable mechanism. However, it is also conceivable to press them on in a hydraulically or pneumatically controlled manner.

In one development of the invention, a stop can also be provided on the first frame, against which the second frame or against which the plastic sheet can be moved during forming. This stop defines the insertion depth or the immersion depth of the second frame into the first frame, in other words the tub depth.

The stop is preferably height-adjustable so that different depths of the formed object can be produced simply by varying the stop height. Consequently, shallower or deeper tubs can be formed by changing the stop height.

For easy height adjustability, the first framework structure preferably comprises a height-adjustable framework section which is arranged on vertical carriers and on which the stop is arranged. The frame therefore comprises a corresponding framework with a vertically adjustable framework section, which can therefore be brought into different height positions. The stop is arranged on this framework section and can therefore be easily positioned as required.

The framework section is preferably frame-shaped, in other words it also comprises four struts with a rectangular framework structure. The framework section is provided with two stop elements which are positioned offset to one another, so that there is therefore a corresponding stop at two positions. This is particularly expedient when designing a suitably long bathtub.

In order to form a drain geometry, which is required on the final sanitary object to enable a water drain and to arrange a drain line, a male forming element is expediently provided on the second frame for forming the plastic sheet while forming a drain geometry. The plastic sheet is formed accordingly by means of this male forming element, which is designed in such a way that it can form a funnel shape in the plastic sheet as a drain geometry, wherein the forming element is preferably only moved against the plastic sheet when the second frame is in the forming end position.

It is advantageous in this case if a female forming element which can be brought into an operative connection with the male forming element in the forming end position is provided on the first frame. The two forming elements therefore interact directly with each other, wherein the female forming element is fixed in position and the male forming element is positioned against it, wherein the plastic sheet is accommodated between them. Naturally, the female forming element has a correspondingly complementary shape, which therefore also allows the formation of the corresponding funnel shape. In this way, the drain geometry can be formed locally using the two forming elements.

The male forming element is preferably movable by means of an adjusting means from a rest position, in which it is at a distance from the plastic sheet, into a forming position, in which it forms the plastic sheet while forming the drain geometry. As described, the male forming element is preferably only moved against the plastic sheet when the second frame has reached the forming end position. Only then is the forming element moved vertically against the plastic sheet so that the latter is formed into the preferably provided female forming element. The male forming element is moved by a suitable adjusting means such as an adjusting cylinder, which can be operated hydraulically or pneumatically, although an electric motor would also be conceivable. This type of forming also ensures that there is a gradient from every position of the tub bottom in the direction of the drain. This may not be the case with thermoforming if the mold has not been precisely designed in terms of its mold geometry.

According to a particularly advantageous development of the invention, the male forming element or, if both are provided, both forming elements are arranged on the first and second frame in their position which can be changed. This embodiment makes it possible to vary the location at which the drain geometry is formed. For example, in the case of a bathtub, the drain geometry can be provided centrally at one longitudinal end or in the middle of the bottom. In a shower tray, depending on the tray geometry, the drain can be located in a corner or, in the case of an elongated rectangular shower tray, also at a longitudinal end. The corresponding position of the drain can be easily adjusted by simply repositioning the forming element or elements.

For easy change of position, it is expedient if the female forming element is arranged on a carrier that is displaceably arranged on the first framework structure and the male forming element is arranged on a carrier that is displaceably arranged on the second framework structure. The carriers can be moved in one direction, for example in the longitudinal direction in the case of a rectangular frame arrangement.

In order to allow the drain position to be changed not just in one direction, but in two orthogonal directions with respect to one another, it is expedient if the two forming elements are arranged on the respective carrier so that they can be displaced. By displacing the forming elements along the carrier, movement in the transverse direction is also possible, so that the two degrees of freedom of movement consequently allow almost any positioning of the forming element or elements.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

BRIEF DESCRIPTION OF THE DRAWING

FIG. 8 shows a view of the forming area in the transition from a side wall to the bottom, FIG. 9 shows a view of the forming area of the drain geometry, FIG. 10 shows a schematic representation of a forming device according to the invention of a second embodiment for producing a shower tray with a second frame inserted into the first frame, FIG. 11 shows a sectional view through the arrangement from FIG. 10.

DETAILED DESCRIPTION OF THE INVENTION

Figure 1:
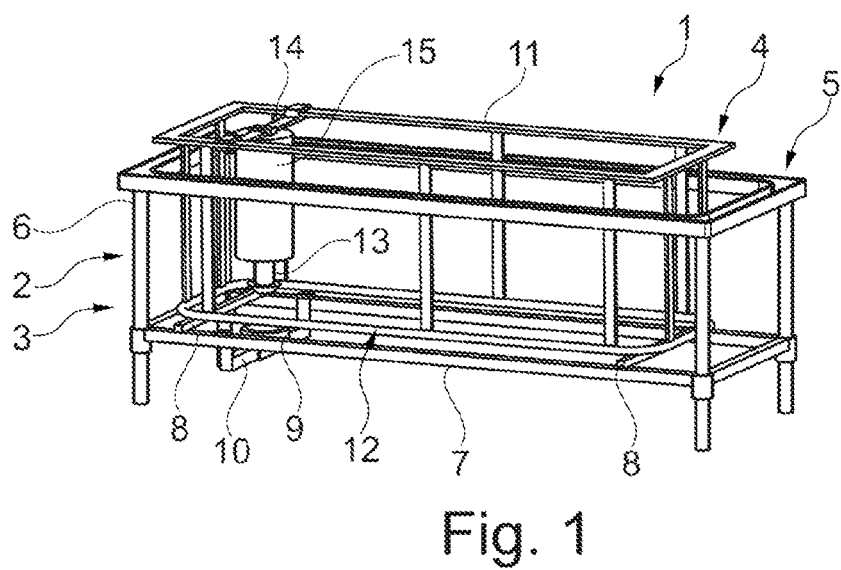
FIG. 1 shows a schematic representation of a forming device according to the invention of a first embodiment, wherein the second frame is inserted into the first frame into the forming end position.

FIG. 1 shows a forming device 1 according to the invention for producing a tub-shaped sanitary object made of plastic with a visible side and a bottom. The forming device 1 shown is designed so as to produce a bathtub. The forming device 1 comprises a frame arrangement 2 which comprises a first frame 3 and a second frame 4. The first frame 3 is an open frame so that the second frame 4, which is somewhat smaller in comparison, can be inserted vertically into the first frame 3 from above, as shown in FIG. 1. A first frame-shaped bending structure 5 is provided on the first frame 3 and is explained in more detail below with reference to FIG. 2. This bending structure 5 is arranged on a framework structure 6, on which there is also a height-adjustable framework section 7 on which is also provided a stop which comprises two stop elements 8 and acts as a stop for limiting the inserted end position of the second frame 4. Furthermore, a female forming element 9 is attached to a carrier 10 on the framework section 7, this carrier 10 can be moved along the framework section 7 and positioned as required. The female forming element 9 can also be displaced along the carrier 10.

The second frame 4 also comprises a framework structure 11, on which a second frame-shaped bending structure 12 is provided, which is also described in detail below in relation to FIG. 3. A male forming element 13 is arranged on the framework structure 11 by means of a carrier 14, wherein the carrier 14 can also be displaced here along the framework structure 11. The male forming element 13 is vertically movable by means of an adjusting element 15, wherein the adjusting element 15 is arranged to be displaceable in a suitable manner along the carrier 14. In a similar manner to the female forming element 9, the male forming element 13 can therefore also be displaced longitudinally and transversely. The two forming elements 9, 13 work together to form a drain geometry, which will be described below.

Figure 2:
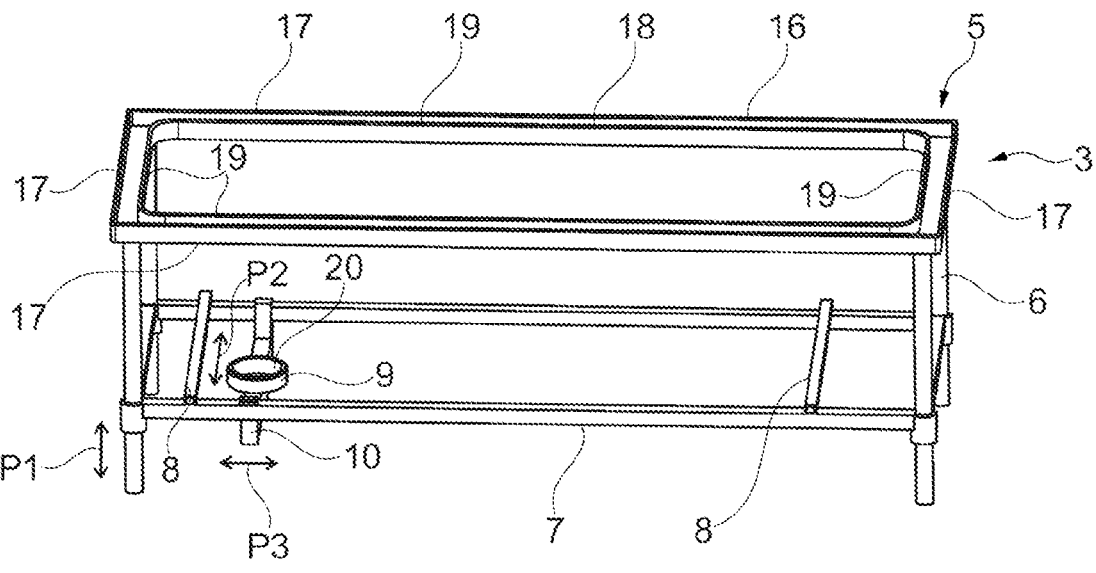
FIG. 2 shows a perspective view of the first frame.

FIG. 2 shows a detailed view of the first frame 3. The rectangular framework structure 6 is shown, on which the framework section 7 is arranged so as to be height-adjustable in a suitable manner, as shown by the arrow P1. Also shown are the two stop elements 8, which are arranged in the area of the frame ends.

The first bending structure 5 is also shown. This first bending structure 5 is used to form an edge section of the sanitary object. It comprises a first outer frame-shaped structural section 16, which is formed by four narrow, strip-shaped flat struts 17, which are connected to form a frame or rectangular shape. Inside the first structural section 16 is a second frame-shaped structural section 18, which also consists of four strip-shaped struts 19, which are also connected to form a rectangular shape, but have rounded corners. An edge geometry is produced by means of the two structural sections 16, 18 and comprises an outer, short and vertically downwardly bent edge section, followed by an essentially horizontal edge section, which then merges into the tub area. The two structural sections 16, 18 can lie in the same plane with their preferably rounded upper edges. As a result, the upper edge section produced extends horizontally, since the plastic sheet to be formed rests on both upper sides or upper edges of the structural sections 16, 18 in the unformed state. Alternatively, the inner structural section 18 can also be slightly deeper than the outer structural section 16, which results in the formed edge section running at a slight angle to the inside of the tub, since the plastic sheet first runs against the inner second structural section 18 when the second frame is inserted, only after this is the plastic sheet formed further to form the tub walls.

Also shown is the quasi-cup-shaped female forming element 9, which has a frustoconical forming surface 20. It is displaceably arranged on the carrier 10 shown by the arrow P2, wherein the carrier 10 can be displaced along the framework section 7 as shown by the arrow P3.

Figures 3, 4, 5:
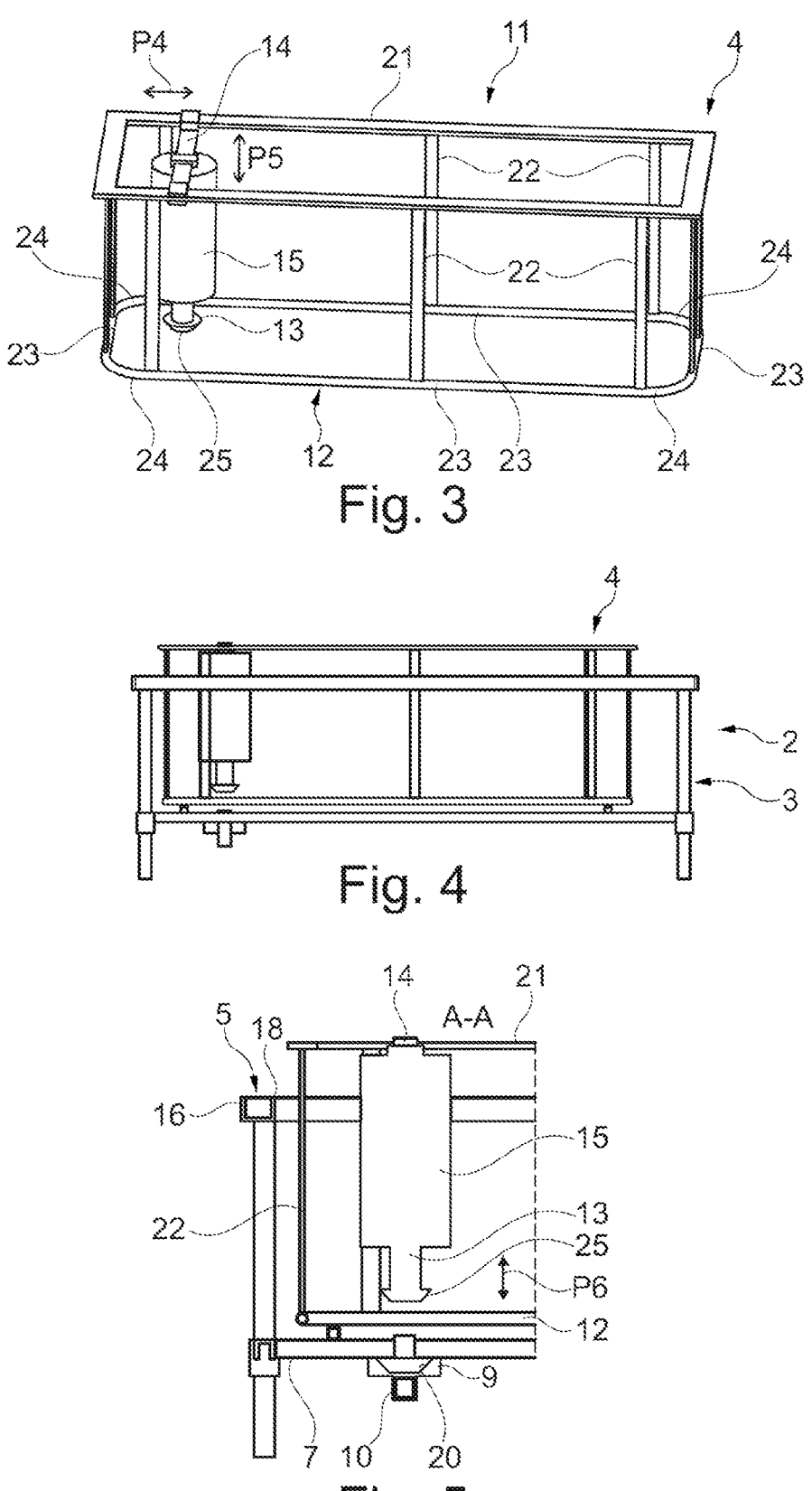
FIG. 3 shows a perspective view of the second frame.
FIG. 4 shows a side view of the forming device from FIG. 1.
FIG. 5 shows an enlarged partial view of the forming device from FIG. 1, showing the two forming elements that form the drain geometry.

FIG. 3 shows a schematic diagram of the second frame 4. Its framework structure 11, which is also rectangular in shape, is shown. It comprises an upper section 21, from which multiple struts 22 run vertically downwards. The second bending structure 12 is arranged at the lower end of the struts 22 and is also formed from four struts 23 which are connected to form a rectangular shape, which merge into one another by means of corresponding bends 24 in the corner areas. While, as described, the structural sections 16, 18 of the first bending structure 5 are formed by flat, strip-shaped struts, the struts 23 of the second bending structure 12 are formed by struts which are preferably round in cross-section, possibly also oval, but can also be tubular.

Also shown is the male forming element 13 as well as the adjusting means 15 and the carrier 14, which is arranged to be longitudinally displaceable at the upper section 21 (see arrow P4), whereas the adjusting means 15 together with the forming element 13 can be moved along the carrier 14 as described (see arrow P5). The forming element 13 is designed like a truncated cone and has a corresponding conical cone surface 25, corresponding to the conical surface 20 of the forming element 9. They therefore fit one inside the other in a form-compatible manner, so that the drain geometry can be formed using this.

As described, and as FIG. 1 also shows, the first frame 3 is open at the top; it is only bounded laterally by the first bending structure 5. This makes it possible for the second frame 4 to be inserted into the first frame 3 from above with the second bending structure leading and for it to be brought into a forming end position, which is limited by the stop elements 8. A side view of the forming device 1 from FIG. 1 is shown in FIG. 4, wherein the second frame 4 is also in the forming end position.

FIG. 5 shows an enlarged partial view of the area of the two forming elements 9 and 13. The male forming element 13 can be moved vertically by means of the adjusting element 15, as shown by the arrow P6, so that it can be inserted into the female forming element 9.

Figure 6:
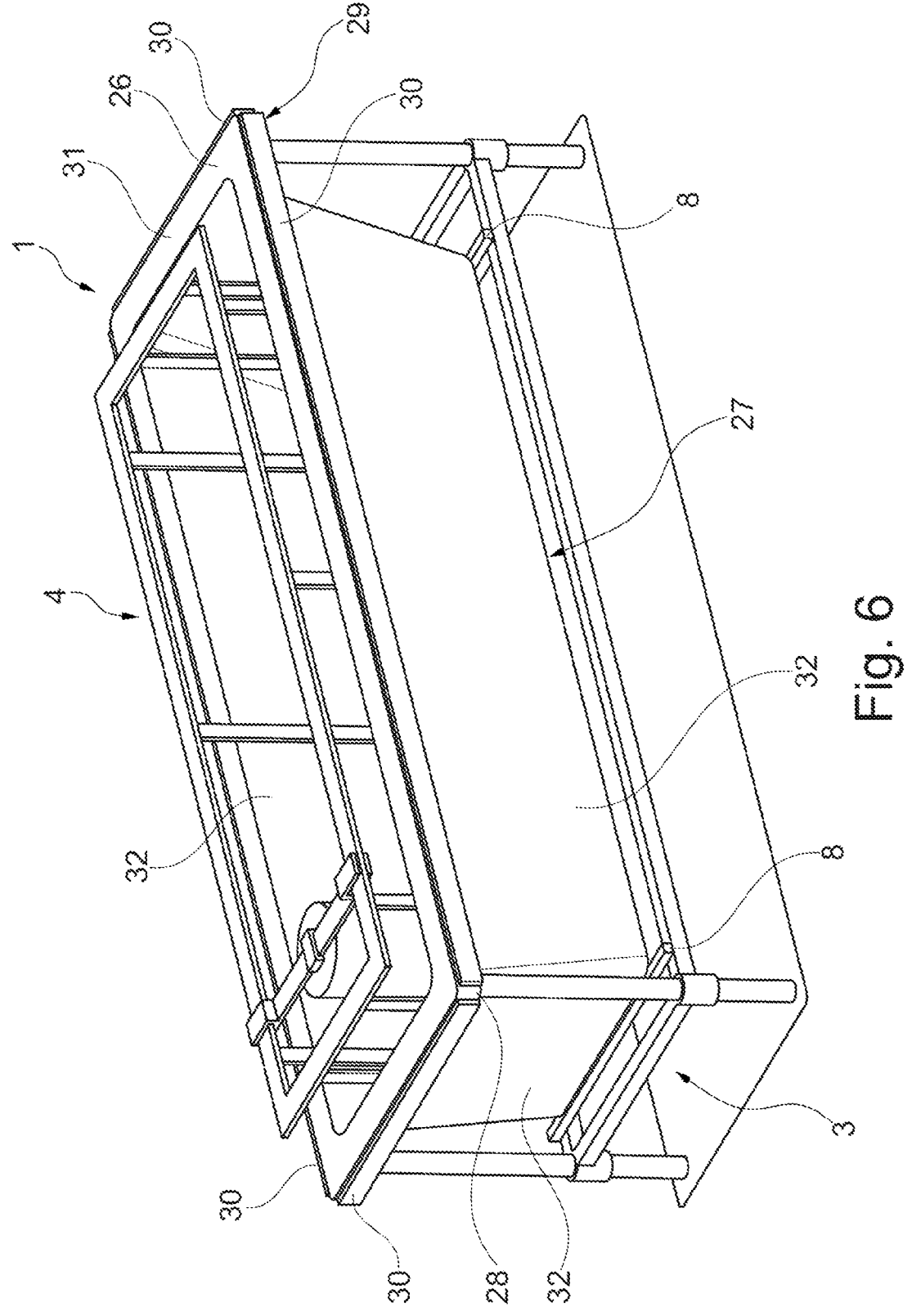
FIG. 6 shows a perspective view of the forming device from FIG. 1 with formed plastic sheet.

FIG. 6 shows the forming device 1 according to the invention, with which a plastic sheet 26 has been formed to form a sanitary object 27 in the form of a bathtub. At the start of the process, the second frame 4 is positioned above the first frame 3 so that the flat plastic sheet 26 can be placed on the bending structure 5 of the first frame 3. It is assumed that the two structural sections 16, 18 lie in the same plane, which results in the plastic sheet 1 resting on both upper edges of the rectangular structural sections 16, 18. In a next step, an edge section 28 of the plastic sheet 26 is angled vertically downwards and fixed in place with a fixing device 29. The fixing device 29 comprises four elongated clamping strips 30, which can be actuated pneumatically, for example hydraulically, and which clamp the angled edge section 28 against the outside of the first structural section 16. This fixes the plastic sheet 26, which as already mentioned is still unformed, in other words has a flat surface.

The second frame 4 is then moved against the plastic sheet 26 from above, which causes the leading second bending structure 12 to run against the upper side 31 of the plastic sheet 26. With further lowering, the plastic sheet 26 is taken along and stretched piece by piece, while forming the tub structure, so that on the one hand the corresponding tub walls 32 are formed, but also the bottom 33. The lowering movement continues until the forming end position is reached, in which the formed plastic sheet 26 is moved against the stop elements 8, wherein the stop elements 8, see FIG. 7, preferably extend exactly below the transversely extending struts 23 of the second bending structure 12. The plastic material is accommodated between the stop elements 8 and the struts 23. Instead of such stop elements 8, a stop can also be provided elsewhere, against which the second frame 4 runs, for example with its framework structure.

Figure 7:
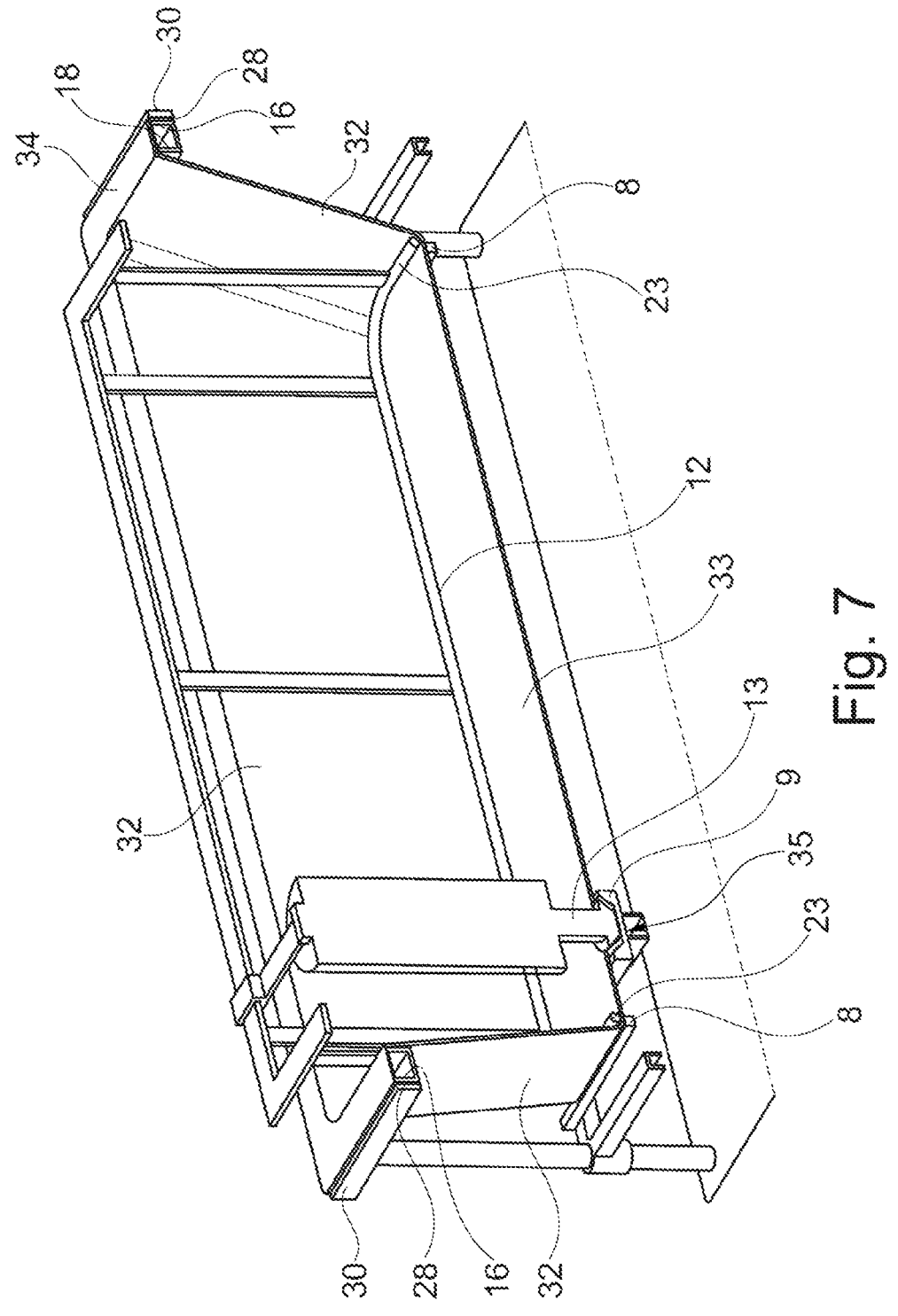
FIG. 7 shows a longitudinal sectional view of the arrangement from FIG. 7.

The sectional view according to FIG. 7 shows the corresponding shape very clearly. On the one hand, the clamping strips 30 are shown, which clamp the edge section 28 against the first structural section 16. Also shown is the horizontal edge section 34, which forms the upper edge of the tub. This edge section 34, which of course also runs around all four sides, merges into the corresponding side walls 32. The angle at which the side walls 32 are positioned relative to the upper edge section 34 and to the bottom 33 depends on the size and positioning of the second bending structure 12. This is because, as FIG. 7 shows, the second bending structure 12 takes the plastic material down with it, wherein the corresponding bends in the transition of the tub walls 32 to the bottom 33 are defined and formed by means of the second bending structure 12, in other words the struts 23, which are round in cross-section, and thus also the bending radius. It can be seen that, depending on where the struts 23 are positioned relative to the second structural section 18, around which the plastic material is bent in the transition from the upper edge section 34 to the tub walls 32, the angle of the tub walls 32 to the upper edge section 34 can be greater or smaller, as can the angle to the bottom 33. The closer a strut 23 is positioned to one of the struts 19, the steeper the tub wall 32 extends, and conversely.

FIGS. 6 and 7 also show the female first forming element 9 and the male second forming element 13, wherein, see the sectioned view according to FIG. 7, the male forming element 13 is inserted into the female forming element 9. A corresponding funnel-or cone-shaped drain geometry 35 is clearly formed by the formed plastic material, as already shown in FIG. 7.

After reaching the forming end position and inserting the forming element 13 into the forming element 9 to form the drain geometry 35, the arrangement remains in this position for a time until the heated plastic material has cooled down. The second frame 4 is then raised again and the forming element 13 is returned so that the formed plastic object can be removed from the first frame 3 after the fixing device 29 has been released.

FIG. 8 shows in the form of an enlarged partial view the region of the transition of a tub wall 32 to the bottom 33. The region of the bend is defined as described by means of the second bending structure 12, in other words by means of the struts 23 in the radius, but the angle which a tub wall 32 assumes to the bottom 33 is also set by means of this, as described. The second bending structure 12 engages on a visible side 36 of the plastic sheet 26, in other words the bend 37 formed is visible from the inside. This is different in the case of the first bending structure 5, which, as FIG. 7 shows, engages on the opposite bottom 38 of the plastic sheet, in other words the linear contact areas there are not visible.

In any case, for forming between the plastic sheet 26 on the one hand and the bending structures 5 and 12 on the other hand, only an approximate linear contact is given, which is defined solely by the contact surface or the angle of contact of the respective bending structure with the plastic sheet 26. All other surface areas of the plastic sheet 26 do not come into any contact with any part of the two frames 3, 4 during the forming process. Rather, all surface areas, in other words the surrounding edge section 34 as well as the tub walls 32 and the bottom 33, are formed or stretched virtually freely in the space.

FIG. 9 shows an enlarged partial view of the interaction of the female forming element 9 and the male forming element 13. The plastic sheet 26 is clearly accommodated between them, here of course already in the unformed state, so that the corresponding funnel-shaped drain geometry 35 is formed. This can then only be opened by removing the bottom section of the drain geometry 35.

FIG. 10 shows a perspective view of a further forming device 1 according to the invention, wherein the same reference symbols are used for the same components. The forming device 1 comprises a frame arrangement 2 having a first frame 3 and a second frame 4 that can be inserted into the open first frame 3 from above. As the sectional view according to FIG. 11 shows, the first frame 3 again comprises a first bending structure 5 with the two structural sections 16, 18, which is used to form the edge, wherein the fixing device 29 is also shown. Also shown is the female forming element 9, which is attached to the framework section 7 in the manner already described above for the first embodiment, and which is also longitudinally and transversely displaceable. Furthermore, the framework section 7 is vertically displaceable on the vertical framework structure 6 and is therefore height-adjustable. Furthermore, the stop elements 8 are arranged on the framework section 7.

The second frame 4 also comprises a framework structure 11, with the upper section 21, on which corresponding vertically extending struts 22 are again arranged, at the lower end of which the second bending structure 12, also frame-shaped, is arranged. As the sectional view according to FIG. 11 shows, this is again formed by cross-sectionally round struts 23, while the structural sections 16, 18 are formed by corresponding strip-shaped, narrow struts 17, 19.

The second frame 4 also comprises the second male forming element 13, which can be moved vertically by means of the adjusting element 15 and brought into operative connection with the forming element 9. The adjusting element 15 is again arranged on the carrier 14 and can be displaced along it, just as the carrier 14 can be displaced along the section 21.

Figure 13:
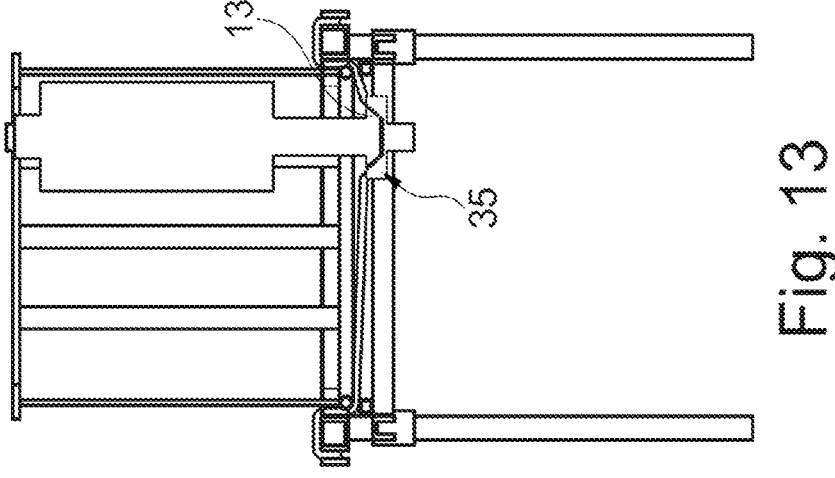
FIG. 13 shows the arrangement from FIG. 12 with interacting forming elements.
Figure 12:
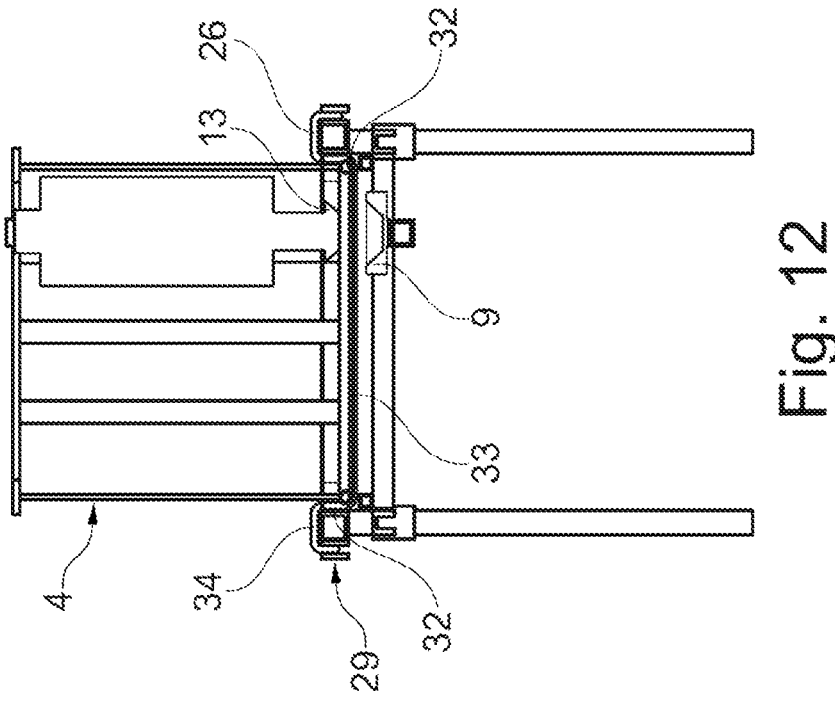
FIG. 12 shows a sectional view corresponding to FIG. 11 with the formed plastic sheet shown.

It is clear in this case that the insertion depth is significantly less than in the embodiment shown in the previous figures, which are used to produce a deep bathtub. This is because a shower tray is significantly lower than a bathtub. FIGS. 12 and 13 show sectional views corresponding to FIG. 11, wherein the carrier plate 26 is shown here in the reshaped position. FIG. 12 shows the plastic sheet 26 which is fixed by the clamping device 29 after the second frame 4 has reached the forming position. The corresponding double-bent or angled edge geometry forming the upper edge section 34 can again be seen, as can the corresponding tub walls 32 and the bottom 33. The two forming elements 9 and 13 do not yet interact, in other words the drain geometry has not yet been formed. However, this is shown in FIG. 13, in which the male forming element 13 is lowered so that the plastic sheet 26 is deformed accordingly, while forming the drain geometry 35.

FIGS. 10-13 clearly show that by simply changing the height position of the stop elements 8 by displacing the framework section 7 vertically along the framework structure 6, it is possible to change the insertion depth and therefore also the depth of the shower tray produced. This is because the plastic sheet 26 is clamped at the top or edge, so this position is fixed. By changing the height of the stop elements 8, however, the depth of the inserting movement is changed accordingly, and therefore also the depth of the tub.

Figure 14:
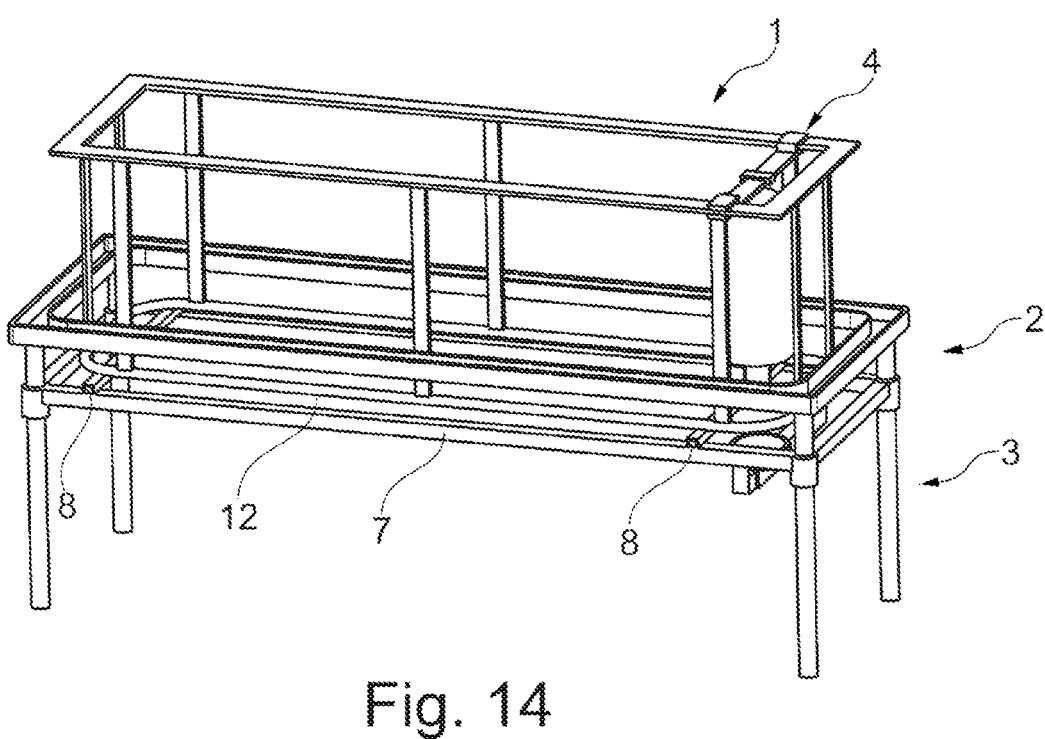
FIG. 14 shows a perspective view of a forming device according to the invention of a third embodiment for producing an elongated shower tray.

FIG. 14 shows a schematic representation of a further forming device 1, with the frame arrangement 2 as is comparably already known from FIG. 1. A first frame 3 and a second frame 4 that can be inserted into it are provided. The structure is identical to the embodiment shown in FIG. 1. Only the second frame 4 is slightly longer, in other words the second bending structure 12 is slightly longer than in the exemplary embodiment shown in FIG. 1. This means that the angle of the front and rear tub wall 32 is slightly steeper. Likewise, the framework section 7 is positioned significantly higher, in other words the stop elements 8 are significantly higher and consequently only a reduced insertion depth is provided. The embodiment shown in FIG. 14 is used to produce an elongated, rectangular shower tray.

Figure 15:
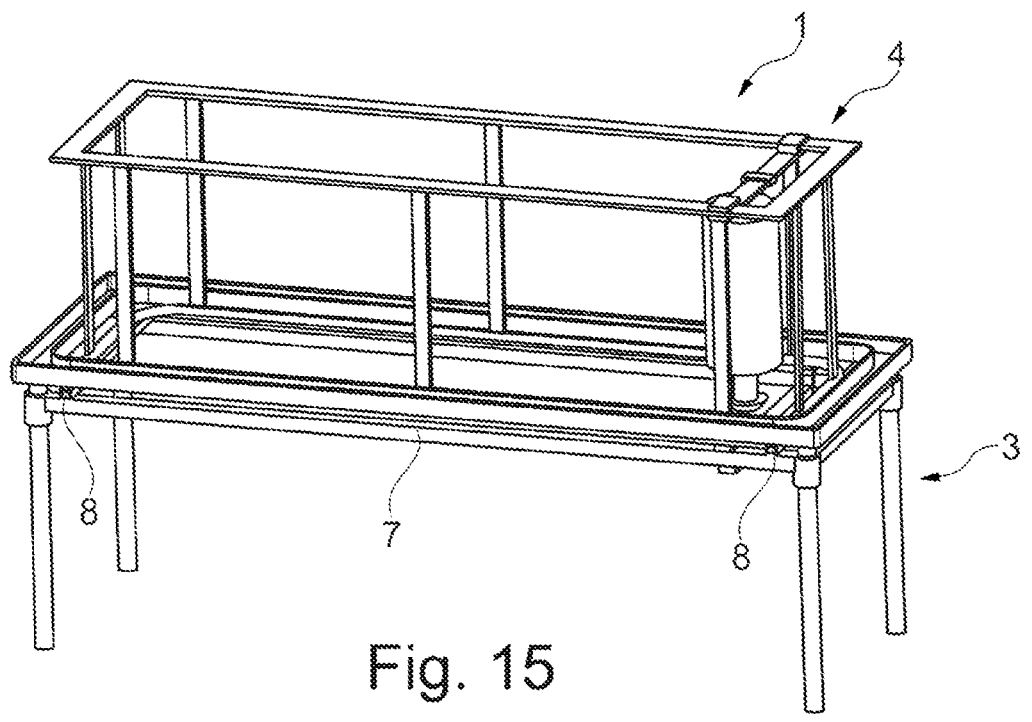
FIG. 15 shows a perspective view of the forming device from FIG. 14 for producing a flatter shower tray.

FIG. 15 shows the forming device 1 already known from FIG. 14, also in the forming end position, although the plastic sheet is not shown here either for reasons of clarity. In this case, the framework section 7 with the stop elements 8 is positioned even higher, so that the insertion depth of the second frame 4 into the first frame 3 is less than in the embodiment shown in FIG. 14. The shower tray that can be produced has an identical basic geometry, but is flatter than the shower tray that can be produced with the embodiment shown in FIG. 14.

As a comparison of FIGS. 1 and 14 shows, the frame arrangements 2 provided there are almost identical. Only the second frame 4 is slightly longer. It is conceivable that a bathtub and a shower tray could be designed with the same dimensions, apart from the depth. Only the angle at which the tub walls extend to the tub bottom can vary, depending on the length of the second frame 4. It is now conceivable that the length of the framework structure of the second frame 4 can be altered, in other words it can be made slightly shorter or longer. For example, the framework structure can be telescoped in the longitudinal direction. The second bending structure 12 is detachable and can therefore be easily replaced by another bending structure adapted to the selected length. This is because the bending structure 12 must not have any unevenness, as would be the case with a telescopic or plug-in design, but must be completely homogeneous in its external shape. In this way, the second frame 4 can be easily modified so that one and the same first frame 3 can be used to produce both a bathtub and a shower tray.

The bending structures 5, 12 are preferably formed from corresponding metal struts, which are appropriately machined on the surface so that the surfaces are as smooth and homogeneous as possible, which applies in particular to the second bending structure 12, which forms a bend on the visible side.

By virtue of the fact that there is only contact between the quasi-linear bending structures 5 and 12 and the plastic material, but not in the area of the corresponding surfaces, homogeneous forming with a defect-free surface or visible surface of the formed object is possible. In particular, the tub walls 32 and the bottom 33 have a homogeneous thickness over the surface, since they are evenly stretched during forming, since there is no contact with any part of the mold that impedes stretching.

After removing the formed object from the first frame 3, the bottom, which is not visible, can be back-injected with a reinforcing material, for example a plastic material reinforced with fibers such as glass fibers, which is used to stiffen it. However, it is not necessary to process the visible surface in any case, as it is not negatively affected by either the forming process or the application of the reinforcing material.

While specific embodiments of the invention have been shown and described in detail to illustrate the inventive principles, it will be understood that the invention may be embodied otherwise without departing from such principles.

We claim:

1. A forming device for producing a tub-shaped sanitary object made of plastic with a visible side and a bottom, comprising a frame arrangement having a first frame with a first frame-shaped bending structure and a second frame with a second frame-shaped bending structure, wherein the second frame can be inserted into the first frame while taking with it a plastic sheet which is fixed to the first frame until the second frame reaches a final forming position in which the tub-shaped sanitary object is formed, wherein the plastic sheet is deformed by the bending structures of both frames to form bends.

2. The forming device according to claim 1, wherein the first frame comprises a first framework structure, on which the first bending structure is arranged, and the second frame comprises a second framework structure, on which the second bending structure is arranged.

3. The forming device according to claim 1, wherein the first bending structure is formed by means of flat struts which have a rectangular cross-section and are connected in a frame-shaped manner and the second bending structure is formed by means of round or oval struts which are connected in a frame-shaped manner.

4. The forming device according to claim 1, wherein the first bending structure comprises an outer first frame-shaped structural section and a second frame-shaped structural section which extends parallel thereto and is lying inside the first structural section.

5. The forming device according to claim 4, wherein the two structural sections extend in a common plane, or in that the first structural section which is lying further outside is higher than the second structural section which is lying inside.

6. The forming device according to claim 1, wherein a fixing device is provided for attaching the plastic sheet to the first frame.

7. The forming device according to claim 6, wherein the fixing device is designed to clamp an edge section of the plastic sheet which is bent around the first bending structure, in particular the outer first structural section.

8. The forming device according to claim 7, wherein the fixing device comprises clamping strips which can be placed laterally against the first bending structure or the first structural section and clamp the edge section thereto.

9. The forming device according to claim 1, wherein a stop is provided on the first frame, against which the second frame or against which the plastic sheet can be moved during forming.

10. The forming device according to claim 9, wherein the stop is height-adjustable.

11. The forming device according to claim 10, wherein the first framework structure comprises a framework section which is arranged in a height-adjustable manner on vertical carriers and on which the stop is arranged.

12. The forming device according to claim 11, wherein the framework section is frame-shaped and is provided with two stop elements which are positioned offset with respect to one another.

13. The forming device according to claim 1, wherein a male forming element is provided on the second frame for forming the plastic sheet while forming a drain geometry.

14. The forming device according to claim 13, wherein a female forming element is provided on the first frame, which can be brought into operative connection with the male forming element in the forming end position.

15. The forming device according to claim 14, wherein the male forming element is movable by means of an adjusting means from a rest position, in which it is at a distance from the plastic sheet, into a forming position, in which it forms the plastic sheet while forming the drain geometry.

16. The forming device according to claim 13, wherein the male forming element or both forming elements are arranged on the first and on the second frame in their position which can be changed.

17. The forming device according to claim 16, wherein the female forming element is arranged on a carrier that is displaceably arranged on the first framework structure and the male forming element is arranged on a carrier that is displaceably arranged on the second framework structure.

18. The forming device according to claim 17, wherein both forming elements are displaceably arranged on the carrier.

* * * * *